Dec. 28, 1948.  A. H. AHRNDT  2,457,622
MEAT TENDERING MACHINE
Filed Sept. 9, 1944  3 Sheets-Sheet 1

Inventor
Arthur H. Ahrndt,
By Spencer, Marzall, Johnston & Cook.
Attys

Dec. 28, 1948.  A. H. AHRNDT  2,457,622
MEAT TENDERING MACHINE
Filed Sept. 9, 1944  3 Sheets-Sheet 2

Inventor
Arthur H. Ahrndt,
By Spencer, Marzall, Johnston & Cook,
Attys.

Patented Dec. 28, 1948

2,457,622

UNITED STATES PATENT OFFICE 2,457,622

MEAT TENDERING MACHINE

Arthur H. Ahrndt, La Porte, Ind., assignor to U. S. Slicing Machine Company, La Porte, Ind., a corporation of Indiana Application September 9, 1944, Serial No. 553,330

1 Claim. (Cl. 17—26)

This invention relates to meat tendering machines and particularly to overload mechanism for a meat tendering machine.

One of the objects of the invention is the provision of means to disconnect the source of power from the knife assemblies of the meat tendering machine when the machine is overloaded.

Another object is to provide power disconnecting overload means for a meat tendering machine which may be reconnected immediately upon the removal of the overload upon the machine.

An additional object is to provide power disconnecting overload mechanism for a meat tendering machine which overloads the drive motor of the meat tendering machine.

A further object of the invention is to provide power disconnecting overload mechanism for a meat tendering machine which forms a part of the mounting means for at least one of the knife assemblies.

A still further object of the invention is the provision of new and novel means of simple construction to resiliently maintain the cutting knives of a meat tendering machine in proper juxtaposition during normal operation but will cause disengagement of the driving gear with the driven gear and prevent feeding when substance of a character is fed so as to stall the machine whereby burning out of the drive motor is prevented.

Numerous other objects and inventions will be apparent throughout the progress of the following specification.

The accompanying drawings illustrate one embodiment of a device incorporating the features of the present invention in which Fig. 1 is a detail cross-sectional view of a meat tendering machine embodying the present invention;

The particular device herein disclosed for the purpose of illustrating the invention is adapted to be applied to the operating mechanism of a meat tendering machine of the type shown in a copending application which matured into United States Letters Patent 2,409,463 on October 15, 1946, and assigned to the present assignee.

Machine frame work and housing

Figure 1:
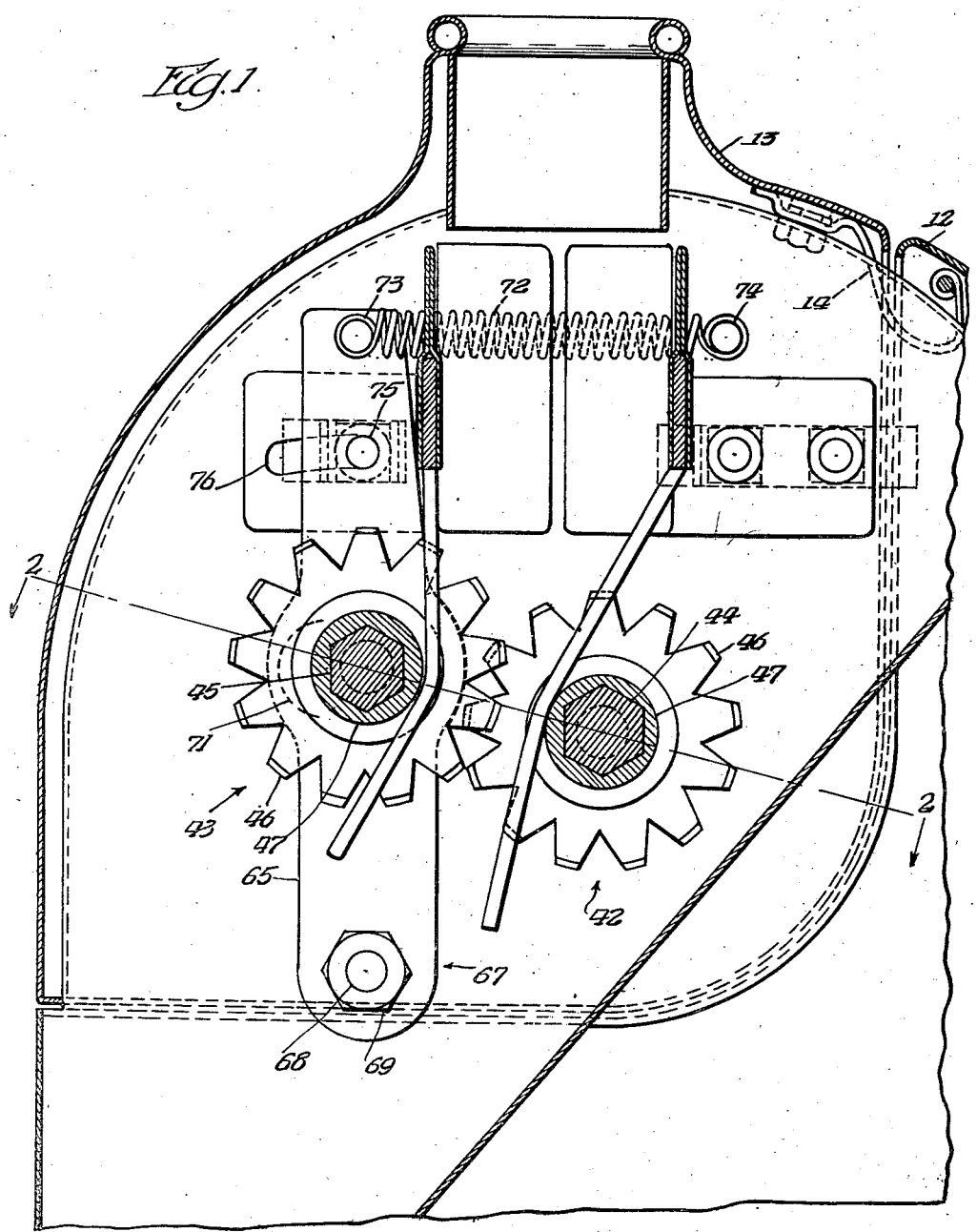
Figure 2:
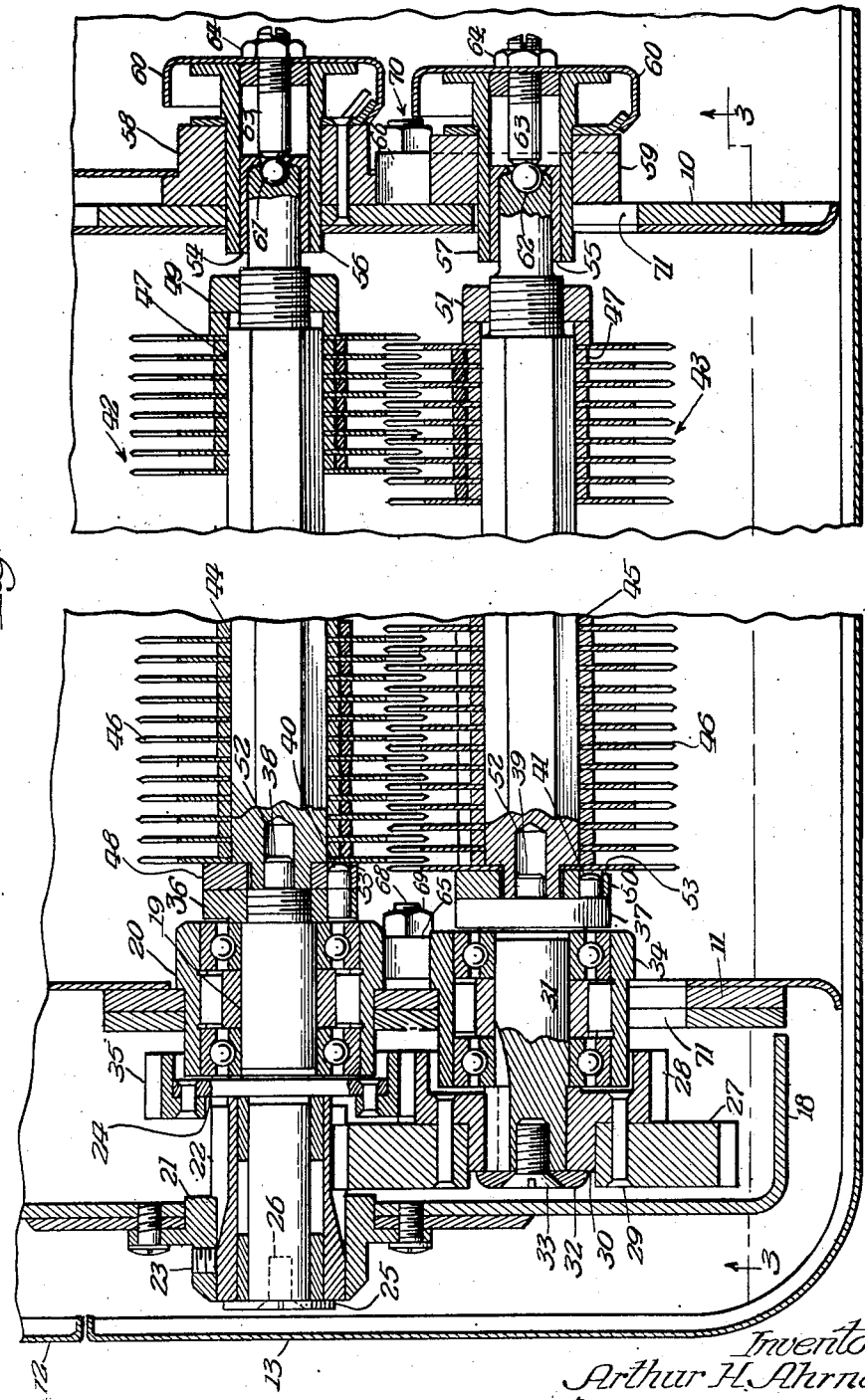
Fig. 2 is a detail longitudinal sectional view on line 2—2 of Fig. 1.
Figure 3:
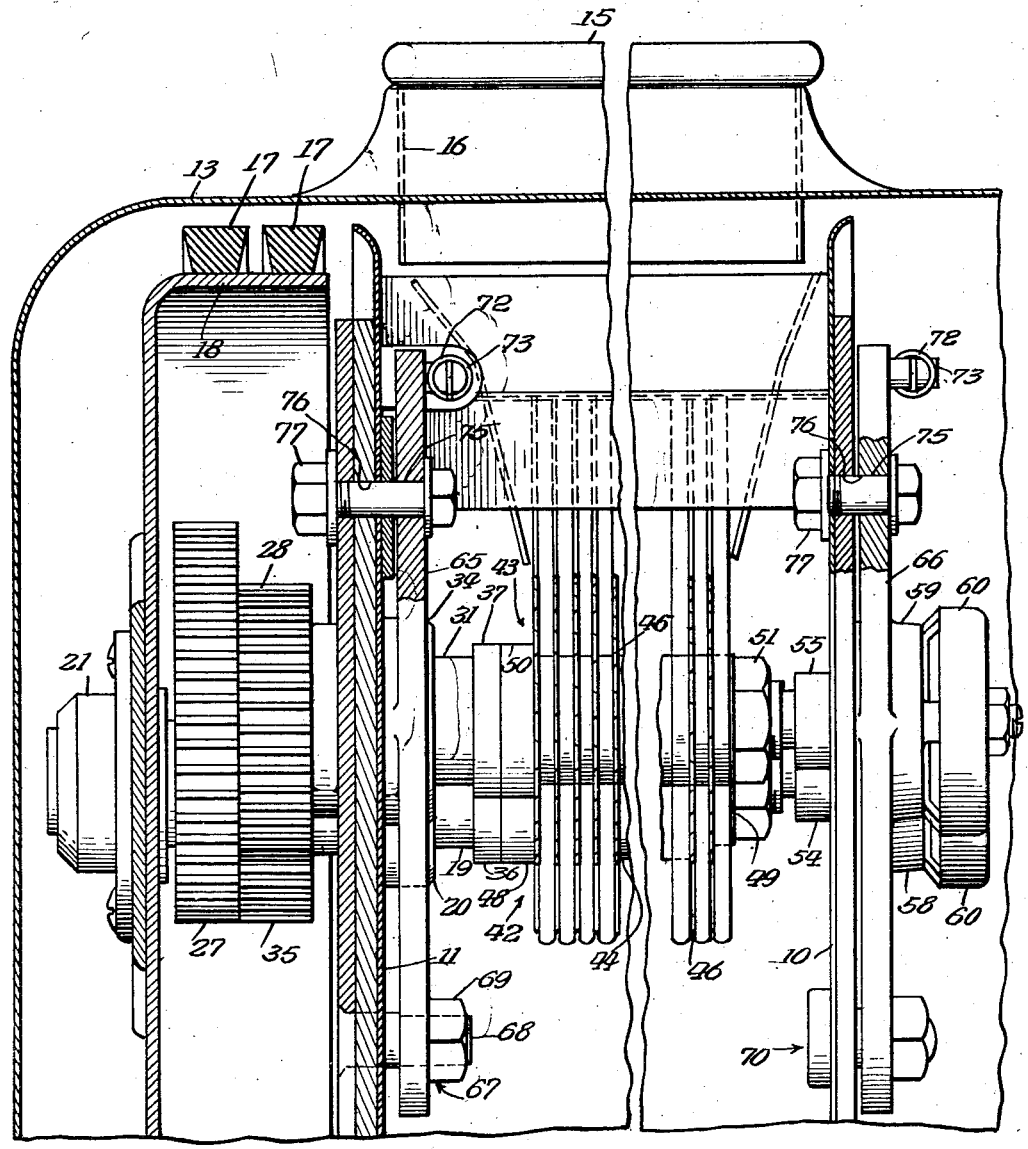
Fig. 3 is a detail longitudinal sectional view on line 3—3 of Fig. 2.

In a meat tendering machine of this type the operating mechanism is generally mounted upon a sturdy framework which includes right-hand and left-hand upwardly extending spaced brackets 10 and 11, respectively, (Figs. 2 and 3). A housing or cover 12 (Figs. 1 and 2) is constructed so as to enclose the operating mechanism of the machine and is provided with a hinged lid portion 13. The lid is hinged to the housing by a plurality of hinges 14 (Fig. 1) and includes an opening 15 (Fig. 3) disposed in the upper part of the lid portion. The opening 15 is provided with a downwardly extending extension guide or chute 16 of such conformation as to conduct food fed into the opening 15 into the operating parts of the machine.

Knife assembly drive mechanism

A pair of V-belts 17 is connected to any source of power, such as to an electric motor, not shown. These V-belts drive a pulley 18 (Figs. 2 and 3) which is loosely and rotatably mounted upon the outer left-hand portion of a knife drive shaft 19. The shaft 19 is journaled in a bearing 20 which is horizontally disposed in the upper portion of the left-hand bracket 11. The pulley 18 is provided with a hub 21 (Fig. 2) which is adapted to receive a pinion 22. The pinion 22 is rotatably mounted upon the drive shaft 19 and is secured for rotation with the pulley 18 by means of a set screw 23. A collar 24 is fixedly mounted upon the drive shaft 19, or it may be made integrally therewith, and is disposed intermediate the pinion 22 and the left-hand end of the bearing 20. Outward sliding movement of the pulley 18 and the pinion 22 is restricted by a washer 25 which is secured to the left end of the shaft 19 by means of a set screw 26.

The pinion 22 meshes with a driven gear 27 (Figs. 2 and 3). This driven gear 27 is secured to a pinion 28 by means of a plurality of connecting means, such as rivets 29. The pinion 28 is provided with a hub portion 30 which is splined to a driven shaft 31 and is secured thereon by a washer 32 and a set screw 33. The driven shaft 31 is mounted for rotation within a bearing 34. The pinion 28 meshes with a gear 35 which is fixedly mounted to the collar 24 and is adapted to rotate therewith.

The ratio between the pinion 22 and the driven gear 27 determines the speed of the driven shaft 31 and the ratio between the pinion 28 and the gear 35 determines the speed of the knife drive shaft 19. These ratios may be changed to suit various operating conditions. Usually it is preferable to have one of these shafts rotate more slowly than the other. The shafts 19 and 31 will obviously rotate in opposite directions and the arrangement of parts is such that the direction is downwardly in the central mating portion of Fig. 2.

A collar 36 is screwed upon a threaded portion of the shaft 19 and is positioned so as to abut and bear against the inner end of the bearing 20 and thus co-operate with the collar 24 to maintain the shaft 19 against sliding movement within the bearing 20. The inner right end of the shaft 31 is provided with a similar collar 37 which co-operates with the pinion 28 to prevent sliding movement of the shaft 31 within the bearing 34.

Collars 36 and 37 are provided with axially extending pins 38 and 39, respectively, and with driving pins 40 and 41, respectively, which are spaced radially from and extend in a direction parallel with that of the pins 38 and 39.

Knife assembly mountings

The knife assembly drive mechanism just described is used to rotate a rear and a front knife assembly 42 and 43, respectively (Figs. 1 and 2). These knife assemblies comprise a hexagonal knife shaft 44 and 45, respectively, and a plurality of circular serrated cutting knives 46. The knife blades are separated from each other by spacers 47. The knife blades 46 and their spacers 47 are secured to the rear knife shaft 44 between an internally threaded collar 48 at the left-hand end of the rear knife shaft and an internally threaded nut 49 at the right-hand end of the shaft (Figs. 2 and 3). The hexagonal shaft is reduced at its left and right-hand ends respectively, and is provided with threaded portions to receive the collar 48 and the nut 49. A similar internally threaded collar 50 and internally threaded nut 51 maintain the knife blades 46 and the spacers 47 upon the front knife shaft 45.

The hexagonal knife shafts 44 and 45 have parallel axes and are each provided with a centrally disposed axially extending hole 52 adapted to receive the pins 38 and 39. Collars 48 and 50 are each provided with a plurality of circumferentially disposed spaced holes 53 adapted to receive the driving pins 40 and 41, a plurality of holes being provided to facilitate mounting of the shafts in an operating position.

The right-hand ends of the knife shafts 44 and 45 are provided with bearings 54 and 55, respectively. The bearings 54 and 55 are rigidly secured to their respective shafts and are journaled within sleeves 56 and 57, respectively. These sleeves are mounted within bearings 58 and 59, respectively, said bearings being securely fastened against rotation. Each of the sleeves 56 and 57 has a knob 60 provided with means to hold each sleeve within its respective bearing. The bearings 54 and 55 are in axial alignment with the bearings 20 and 34, respectively, and thus secure the knife shafts 44 and 45 for rotation in a suitable parallel relationship.

An adjustable thrust bearing is provided for each of the shafts 44 and 45. This thrust bearing comprises ball bearings 61 and 62, respectively, which are arranged to engage the right-hand ends of the knife shafts 44 and 45 and to bear against adjusting screws 63 provided in the knobs 60. Each of the screws 63 may be locked in position by a nut 64.

The above mechanism has been described solely for the purpose of illustrating an example of one type of environment in which the present invention may be used. Naturally, the environment for the invention is subject to such changes and alterations as may appear feasible and desirable to the person using the within invention. The novelty of applicant's disclosure consists mainly in the structure for mounting the driven shaft 31 and the front knife assembly 43.

During normal operation the knife assemblies are urged toward each other so as to tender the meat which is fed between the assemblies. If, however, an unusually thick or particularly tough piece of meat is fed into the machine, there would be a tendency to stall the machine and possibly burn out the motor or damage some of the other operating parts. Applicant's invention provides means for preventing any damage due to an overload which incorporates a novel knife assembly mounting mechanism so that the knife assemblies may be moved out of engagement in the event of an overload and thereby disconnect the drive from the motor to the knife assemblies.

Front knife assembly mounting

The front knife assembly 43, its driven shaft 31, its left-hand bearing 34 and its right-hand bearing 55 are mounted for transverse movement with respect to the rear knife assembly 42 and its associated bearings, and both knife assemblies are constantly urged toward each other to maintain proper engagement. This mounting means comprises a left-hand mounting arm 65 and a right-hand mounting arm 66. The housing of the left-hand front bearing 34 is securely fastened to the mounting arm 65 and the entire assembly of the mounting arm, the bearing, and those portions of the mechanism rotatably supported by the bearings are pivotally mounted to the left-hand bracket 11 by means of a pivot 67 at the lower end of the left-hand mounting arm 65. This pivot may be of any desired construction and, as illustrated, comprises a screw 68 and a nut 69. The right-hand mounting arm 66 is similarly pivoted at 70 and forms a support for the right-hand front bearing 59 and all operating parts carried thereby.

Through the use of this pivoted mounting, the entire front knife assembly and its operating mechanism comprising the driven gear 27, the pinion 28, the driven shaft 31, the front bearing 34, the knife assembly 43, and the right front bearing 55 may be moved toward and away from their companion elements at the rear of the machine. When they are moved away from each other, the pinion 22 and the driven gear 27 are disengaged and the pulley 18 is free to rotate without imparting any motion to the rest of the machine. Similarly, the pinion 28 and the gear 35 are disengaged and the front and rear knife assemblies 43 and 42 are disengaged. A suitable slot 71 (Figs. 1 and 2) is provided in each of the right and left-hand brackets 10 and 11 to permit this transverse movement.

The front and rear knife assemblies 43 and 42, together with their respective mountings and operating mechanism, are urged toward each other by means of springs 72 (Figs. 1 and 3). These springs are located at each end of the machine and are secured between studs 73 and studs 74. The studs 73 are mounted upon the mounting arms 65 and 66 and the studs 74 are supported by the brackets 11 and 10. The tension of the springs 72 acts upon the arms 65 and 66 and urges the parts carried by the arms into engagement with their co-operating elements carried by the brackets 11 and 10.

The upper ends of the mounting arms 65 and 66 are maintained in alined relation with the brackets 11 and 10 by means of a pair of guide screws 75. These guide screws extend through arcuate slots 76 in the brackets 11 and 10 and are maintained in position by nuts 77. The combination of the guide screws, the nuts and the arcuate slots performs the function both of maintaining the mounting arms in proper alined relation with their brackets, and of limiting the transverse movements of the front knife assembly 43 and its companion mechanism.

Operation of machine

Power in transmitted through the V-belts 17, to the pulley 18. This pulley together with the pinion 22 attached thereto revolves freely on the knife drive shaft 19 and its rotation is transmitted from the pinion 22 to the driven gear 27. The driven gear 27 rotates its companion pinion 28 and the driven shaft 31, and the pinion 28 rotates the gear 35 and the knife drive shaft 19. The rotation of the driven shaft 31 and the knife drive shaft 19 rotates the front and rear knife assemblies 43 and 42, respectively.

During the normal operation of the machine, the tension of the springs 72 will maintain this drive mechanism in engagement and if the food substance, such as a piece of meat, is dropped into the opening 15 and the chute 16, it will be tendered by the action of the knife blades 46 of the knife assemblies. If, however, the food substance is beyond the capacity of the machine, such as a piece of meat containing a bone or a piece of meat which is too tough or thick for the knife assemblies, it will tend to spread the knife assemblies apart against the tension of the springs 72. When this is done, the driven gear 27, the pinion 28 and the front knife assembly 43 will all be moved out of engagement with the pinion 22, the gear 35 and the rear knife assembly 42, respectively. Disengagement of the pinion 22 and the gear 27 disconnects all flow of power to the knife assemblies and disengagement of the pinion 28 and the gear 35 permits the two knife assemblies to be independently rotated to permit an easy withdrawal of the food particle causing the overload.

The applicant's overload mechanism instantly disconnects the flow of power when an overload condition prevails. This prevents damage to the motor and prevents strain upon the other operating parts of the meat tendering machine. As soon as overload occurs, the drive is disconnected. The operator can then shut off the electric motor and easily remove the offending food article. As soon as the food article has been removed, the springs 72 will re-engage the operating mechanism of the machine, the power may be reconnected, and the machine is again ready for normal operation.

Changes may be made in the form, construction and arrangement of the parts without departing from the spirit of the invention, and the right is hereby reserved to make all such changes as fairly fall within the scope of the following claim.

The invention is hereby claimed as follows:

In a meat tendering machine having a base and a movable element, a plurality of rotatable knife assemblies, one of which is mounted upon said base, and another upon said movable element, a drive pulley rotatably mounted upon the base of the machine, a pinion mounted upon the base of the machine for rotation with said drive pulley and operatively related to said one of the knife assemblies, a driven gear mounted upon said movable element and operatively related to the other knife assembly for engagement with said pinion, a second pinion mounted upon said movable element for rotation with said driven gear, and a second driven gear mounted upon the base of the machine and operatively related to said one of the knife assemblies and adapted to engage said second mentioned pinion, said pinions being disengaged from their respective driven gears whenever the meat tendering machine is overloaded.

ARTHUR H. AHRNDT.

REFERENCES CITED

The following references are of record in the file of this patent:

UNITED STATES PATENTS

| Number | Name | Date |
|---|---|---|
| 571,266 | Favrow | Nov. 10, 1896 |
| 937,322 | McBratney | Oct. 19, 1909 |
| 1,277,073 | Hicks | Aug. 27, 1918 |
| 1,520,899 | Barnes | Dec. 30, 1924 |
| 2,131,397 | Gurney | Sept. 27, 1938 |
| 2,163,123 | Huse | June 20, 1939 |